United States Patent [19]
Levine et al.

[11] 4,059,346
[45] Nov. 22, 1977

[54] CONTROLLED FOCUS MIRROR WITH RIM CONTROLLED FLEXURE

[75] Inventors: Howard S. Levine, San Jose, Calif.; Robert Winter, Dix Hills, N.Y.

[73] Assignee: Grumman Aerospace Corporation, Bethpage, N.Y.

[21] Appl. No.: 701,196

[22] Filed: June 30, 1976

[51] Int. Cl.² .............................................. G02B 5/10
[52] U.S. Cl. ................................................. 350/295
[58] Field of Search ...................................... 350/295

[56] References Cited
FOREIGN PATENT DOCUMENTS

| 400,445 | 10/1933 | United Kingdom | 350/295 |
| 380,473 | 9/1932 | United Kingdom | 350/295 |

*Primary Examiner*—Jon W. Henry
*Attorney, Agent, or Firm*—Arthur S. Haapaniemi; Mellor A. Gill

[57] ABSTRACT

A variable focus mirror comprising a uniform elastic disk having a mirror finish on one face thereof, which is urged against an annular fulcrum concentric with the disk by a uniform force applied at the rim of the disk. This force causes the flat disk to be flexed into a substantially spherical, nearly parabolic shape. The magnitude of the force applied controls the degree of flexure and hence the focal length of the spherical mirror. For laser beam focusing the materials are selected to be able to withstand the laser energy being reflected.

4 Claims, 7 Drawing Figures

CONTROLLED FOCUS MIRROR WITH RIM CONTROLLED FLEXURE

APPLICATION

Field of Invention

The present invention relates to optical devices and has particular reference to variable focus mirrors for use with laser energy.

BACKGROUND

Variable focus mirrors which have been proposed in the prior art have generally relied on uniform loading of a plate, as by a vacuum over the entire rear surface, to produce a cup shaped mirror. The shape thus obtained for a uniform thickness plate is neither parabolic nor spherical and, in an effort to produce the desired shape the plate thickness is made non-uniform. A modification thereof applies a non-uniform load to a plate by a plurality of unevenly loaded mechanical connections attached to the rear of the plate. Another method of variably flexing a disk, wherein the circumferential edge of the disk is placed in a circular frame of adjustable diameter, has also been described in the prior art.

The present invention is a departure from prior art in that the disk is flexed by application of a force uniformly distributed along the outer edge, urging the disk against a concentric fixed annular fulcrum and causing the portion of disk inside the smaller ring to flex into a substantially spherical shape. Alternately, the inner ring can move the disk against a fixed annular fulcrum at the rim, obtaining similar results. The degree of flexure establishes the focal length of the mirror which is readily adjusted by the controlled force applied to the disk. The curvature of the mirror may be either concave or convex according to the direction of the applied moment with respect to the mirrored surface of the disk. The deflected shape remains spherical for all ranges of focal length, as long as the disk remains elastic.

The present invention is particularly useful in laser application where the rugged nature of the device will assure longevity even when high energy laser beams are reflected.

In one embodiment of the present invention, the flat surface disk of uniform cross section is supported by the rim in a hollowed out piston. A frame structure surrounds the piston and is provided with an annular ring contacting the face of the disk. Relative displacement of the piston and frame applies a force to the disk which flexes into a spherical surface. The driving force on the piston is preferably applied hydraulically although any suitable driving means may be employed. It is an object of this invention to provide a controllable variable focus mirror for laser application.

It is another object of this invention to provide a spherical surface over a large range of focal length with means for adjusting the radius of curvature of the surface.

It is a further object to promote simple fabrication of adjustable mirrors by using an initially flat, uniform thickness disk.

For a more complete understanding of the invention, reference may be had to the accompanying diagrams in which:

FIG. 1(a) and 1(b) illustrate the principle of the invention.

Figure 1A:
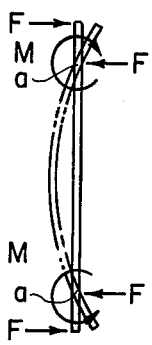
Figure 1B:
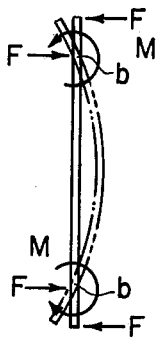

FIGS. 1(a) and 1(b) illustrate the principle behind the invention. It is known that if a thin, uniformly thick, circular flat plate or disk is subjected to a force F applied uniformly along the rim and opposed by an equal force F uniformly applied at the circular ring $a-a$, then a uniform bending moment M will be imposed on the portion of the disk inside the ring $a-a$, deforming the inner portion into a spherical surface. If the plate in FIGS. 1(a) and 1(b) has a front surface mirror on the right hand side, the moment M tending to rotate the center of the plate in FIG. 1(a) to the left will create a concave mirror, while in FIG. 1(b) the moment M will create a convex mirror.

An analysis of the curvature of the plate shows that the spherical surface is very close to a parabolic surface. Maximum deviation from the parabolic surface appears at the rim of the disk. In a typical example, the deviation of the surface from truly parabolic in a 50 cm disk forced at 100 meters is only two parts in a million.

Figure 2:
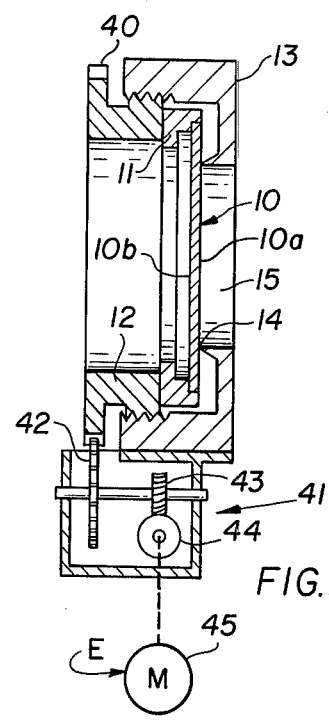
FIG. 2 is a sectional view of one embodiment of a variable focus mirror.

FIG. 2 is a cross section of the simplest implementation of a controllable variable focus mirror embodying this invention. A uniform thickness disk 10 having a reflecting surface 10a is held securely by its rim in an annular member 11. The annular member 11 fits easily within a closely fitting cylindrical frame 13 which has an annular reaction flange 14 and an opening 15 at the end facing disk 10. The annulus 14 is concentric with disk 10, and the diameter thereof is smaller than that of disk 10.

An adjusting ring 12 is threaded into the frame 13 behind the member 11 so that as ring 12 is rotated the annular member 11 is urged forward, driving the disk 10 against annulus 14. Further rotation of ring 12 applies a force to the rim of disk 10 causing the disk 10 to flex about the fulcrum of annulus 14 so that the reflective surface 10a assumes a concave spherical shape, as in FIG. 1(a). Alternately if the opposite face 10(b) of the disk 10 is a reflecting surface a convex spherical mirror as in FIG. 1(b) will result.

The radius of curvature of the flexed mirror 10a and 10b and hence the focal length thereof can be regulated by adjusting ring 12 to apply more or less force to the rim of the disk 10. It will be obvious that if ring 12 is fixed in place after the desired flexing of disk 10 is achieved, a fixed focus mirror will be produced. However, in a truly variable focus device, ring 12 is provided with means for rotation thereof. FIG. 2 shows, as an example, an auxiliary gear drive 41 which is attached to frame 13. The gear drive 41 includes a spur gear 42, which meshes with gear teeth 40 on the ring 12, and which is driven by worm gear 43 in worm 44. The worm 44 may be driven by any conventional means, such as a thumbwheel (not shown) or an electrically controlled motor 45 energized by an electrical signal E, for example.

Figure 3:
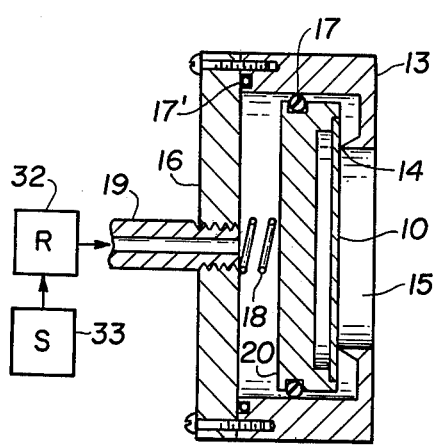
FIG. 3 is a sectional view of another embodiment of a single acting variable mirror.

FIG. 3 shows a cross section of a hydraulically controlled variable focus mirror. Here the disk 10 is held in the piston 20 by its rim. The piston 20 is hollowed out behind the disk 10 to provide clearance for the flexing disk. A back plate 16 is bolted on to frame 13 to form a chamber behind piston 20 which is made fluid tight by O ring 17 around the piston and O ring 17' between the plate 16 and frame 13. A soft spring 18 between piston 20 and back plate 16 urges the disk 10 lightly against annular flange 14 in the rest condition.

Hydraulic fluid from a supply 33 is admitted to the chamber behind piston 20 through pressure regulator 32 and fitting 19, forcing piston 20 to the right in FIG. 3 and applying a force in that direction to the rim of the disk 10. The resulting moment, flexing disk 10 about annulus 14 deforms the disk 10 into a concave spherical shape as in FIG. 1(a).

Figure 5:
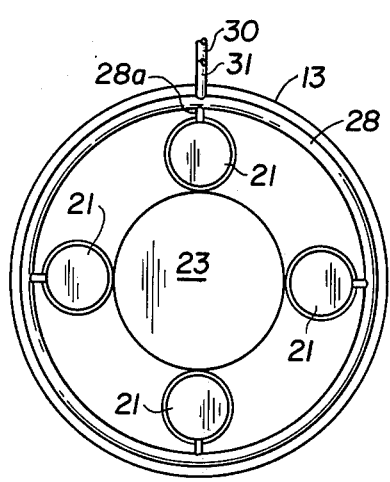
FIG. 5 is an end view of FIG. 4.
Figure 4:
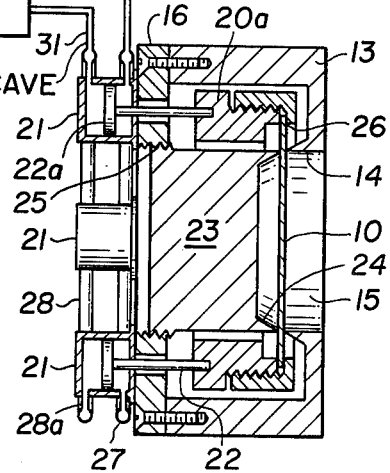
FIG. 4 is a sectional view of a double acting variable focus mirror.

FIG. 4 is a modification of FIG. 3 adapted for driving the mirror disk 10 into either a concave or convex shape. As there shown, the frame 13 houses an annular member 20a which can be driven to the right or left by a plurality of hydraulically operated piston rods 22 equally spaced about the periphery. As seen in FIG. 5, the cylinders 21 for the pistons 22a for driving rods 22 are arranged in a circle on the back plate 16.

Only four cylinders are shown in the illustration but many more may be used in practice. Threaded into an aperture in the back plate 16 is the rear frame block 23, which has an annular fulcrum 24 formed on the front thereof and which fits within the opening of the annular member 20a. The block 23 is urged against the disk 10 by rotation in the threads 25 and is so designed that the annulus 24 is directly opposite annulus 14, and of the same size. Preferably the disk 10 is not squeezed between the annuli 14, 24 but rather rests lightly on both. The disk 10 is firmly held in a groove 26 in the annular member 20a so that motion of the member 20a to the right or left forces the disk to flex on the appropriate annulus 14 or 24 into concave or convex shape, respectively. The annular member 20a may be made in two pieces to facilitate placement of the disk 10 in the groove 26 during manufacture of the unit.

The pistons 21 are all actuated simultaneously by supplying fluid to the appropriate header 27 or 28 according to the direction in which the disk 10 should be flexed. Pressurized fluid is supplied to the header 27, or 28 from supply 33 through regulator 32, selector valve 29, and hydraulic line 30 or 31 as required for the desired direction of force to be applied to disk 10. The regulator 32 will be adjusted to vary the loading of disk 10 to select the degree of deflection of disk 10 required to obtain the focal length desired in the mirror. Fluid is supplied to each cylinder from the headers by connecting pipes such as 28a.

Figure 6:
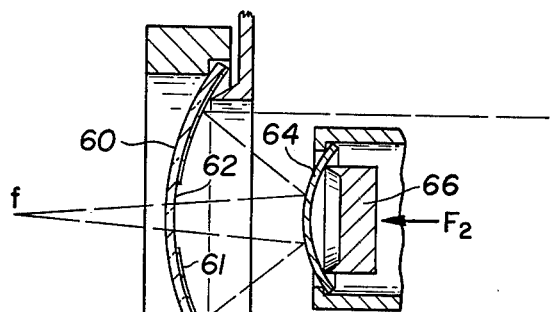
FIG. 6 illustrates the application of the invention to a reflecting telescope.

FIG. 6 shows how the variable focus mirror of this invention can be applied to a reflecting telescope, for example, or to a laser communication system.

A uniform thickness transparent disk 60, such as glass, is coated with a reflecting coating 61 leaving a transparent opening 62 in the coating 61 at the center of the disk. The disk 60 is deflected into a concave shape by force F, acting with the rim of the disk 60, pushing the disk 60 against the annlar fulcrum 63. Energy rays impinging on the surface 61 are relfected onto a convexly deformed disk 64 which again reflects the energy through the opening 62 to a focus at $f$. The disk 64 is also a variable focus device wherein the rim of the disk 64 is held stationary and a force F2 is applied to an annular ring 66 causing the spherically convex deformation of the disk 64. In prior apparatus of this type for variable focusing the second reflector e.g. 64 had to be displaced physically along the axis of the device, an extremely delicate and precise operation which, operation is eliminated by use of this invention.

Those skilled in the art will recognize that both of the mirrors in FIG. 6 need not be variable focus devices but that either one or the other can be a fixed focus device. Also, the point $f$ could be the location of a source of energy, e.g. laser source, which is to be focussed at a target point a considerable distance away, e.g. a satellite for communication purposes, as well as the focus of incoming energy.

Although the description above has stressed the use of uniform thickness disks for a spherical configuration of the deformed disk, if the thickness is non-uniform, a configuration other than spherical will be obtained. In some cases such non-uniformity may be purposely designed into the elastic disk in order to obtain a non-spherical mirror.

Furthermore, although hydraulically operated means was specified in certain instances, pneumatic means can be substituted, if desired.

It should be recognized that only a few embodiments have been described, and that various changes in the specific forms shown may be made within the scope of the following claims without departing from the spirit of the invention.

I claim:

1. In a variable focus mirror, a frame, a first internally extending annulus on said frame,
    a second internally extending annulus on said frame opposite said first annulus,
    a uniform, unstressed elastic disk, said disk having a diameter greater than the diameter of said annuli,
    a reflective surface on said disk,
    said disk being interposed said annuli,
    disk holding means encircling the rim of said disk for holding said disk in concentric relationship with and adjacent said annuli,
    means for adjusting the position of said disk holding means axially relative to said annuli and thereby applying a force at the periphery of said disk in a direction urging said disk against said first or second annulus,
    whereby said disk is flexed and said reflective surface assumes a substantially spherical concave configuration when said disk is urged against said first annulus, and said disk is flexed and said reflective surface assumes a substantially spherical convex configuration when said disk is urged against said second annulus whence the focal length of said mirror is varied in accordance with the degree of flexure of said disk.

2. The device in claim 1 wherein said means for applying the force to said disk includes a double acting piston member,
    means for attaching said disk holding means to said piston, and
    means for driving said piston.

3. The device in claim 2 wherein said piston driving means is hydraulically operated.

4. The device of claim 2 wherein said piston driving means is electrically operated.

* * * * *